(12) United States Patent
Li et al.

(10) Patent No.: US 11,675,050 B2
(45) Date of Patent: Jun. 13, 2023

(54) LIDAR DETECTION SYSTEMS AND METHODS

(71) Applicant: INNOVUSION IRELAND LIMITED, Los Altos, CA (US)

(72) Inventors: Yimin Li, Cupertino, CA (US); Rui Zhang, Palo Alto, CA (US); Junwei Bao, Los Altos, CA (US)

(73) Assignee: Innovusion, Inc., Sunnyvale, CA (US)

( * ) Notice: Subject to any disclaimer, the term of this patent is extended or adjusted under 35 U.S.C. 154(b) by 1054 days.

(21) Appl. No.: 16/242,534

(22) Filed: Jan. 8, 2019

(65) Prior Publication Data

US 2019/0212416 A1 Jul. 11, 2019

Related U.S. Application Data

(60) Provisional application No. 62/615,280, filed on Jan. 9, 2018.

(51) Int. Cl.
| | | |
|---|---|---|
| *G01S 7/48* | (2006.01) | |
| *G01S 7/481* | (2006.01) | |
| *G02B 7/02* | (2021.01) | |
| *G01S 7/486* | (2020.01) | |
| *G02B 26/12* | (2006.01) | |

(Continued)

(52) U.S. Cl.
CPC ............ *G01S 7/4814* (2013.01); *G01S 7/486* (2013.01); *G01S 7/4813* (2013.01); *G01S 7/4817* (2013.01); *G01S 17/931* (2020.01); *G02B 7/021* (2013.01); *G02B 26/121* (2013.01); *G01S 17/89* (2013.01)

(58) Field of Classification Search
CPC .... G01S 7/4814; G01S 7/4813; G01S 7/4817; G01S 7/486; G01S 17/931; G01S 17/89; G02B 7/021; G02B 26/121; G02B 26/105; G02B 26/124; G02B 27/123
See application file for complete search history.

(56) References Cited

U.S. PATENT DOCUMENTS

| | | |
|---|---|---|
| 3,897,150 A | 7/1975 | Bridges et al. |
| 4,412,720 A | 11/1983 | Costa |

(Continued)

FOREIGN PATENT DOCUMENTS

| | | |
|---|---|---|
| CN | 204758260 U | 11/2015 |
| CN | 204885804 U | 12/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Tony Ko
(74) *Attorney, Agent, or Firm* — Mauriel Kapouytian Woods LLP; Wensheng Ma; Liang Huang

(57) ABSTRACT

Embodiments discussed herein refer to a relatively compact and energy efficient LiDAR system that can be mounted to a windshield on the interior cabin portion of a vehicle. In order to accommodate the relatively compact size of the LiDAR system, multiple moveable components are used to ensure that a desired resolution is captured in the system's field of view.

31 Claims, 10 Drawing Sheets

(51) Int. Cl.
*G01S 17/931* (2020.01)
*G01S 17/89* (2020.01)

(56) References Cited

U.S. PATENT DOCUMENTS

| | | |
|---|---|---|
| 4,464,048 A | 8/1984 | Farlow |
| 4,923,263 A | 5/1990 | Johnson |
| 5,006,721 A | 4/1991 | Cameron et al. |
| 5,157,451 A | 10/1992 | Taboada |
| 5,303,084 A | 4/1994 | Pflibsen et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,175,440 B1 | 1/2001 | Conemac |
| 6,317,202 B1 | 11/2001 | Hosokawa et al. |
| 6,501,586 B1 | 12/2002 | Takayama |
| 6,594,000 B2 | 7/2003 | Green et al. |
| 6,650,404 B1 | 11/2003 | Crawford |
| 6,788,445 B2 | 9/2004 | Goldberg et al. |
| 6,788,861 B1 | 9/2004 | Utsui et al. |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,382,442 B2 | 6/2008 | Adachi et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,583,364 B1 | 9/2009 | Mayor et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,869,112 B2 | 1/2011 | Borchers et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,072,663 B2 | 12/2011 | O'Neill et al. |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,041,762 B2 | 5/2015 | Bai et al. |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,368,936 B1 | 6/2016 | Lenius et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,598,790 B2 | 3/2020 | Rubin |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,732,281 B2 | 8/2020 | LaChapelle |
| 10,768,304 B2 | 9/2020 | England et al. |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,016,192 B2 | 5/2021 | Pacala et al. |
| 11,022,688 B2 | 6/2021 | Eichenholz et al. |
| 11,022,689 B2 | 6/2021 | Villeneuve et al. |
| 11,194,048 B1 | 12/2021 | Burbank et al. |
| 2002/0136251 A1 | 9/2002 | Green et al. |
| 2003/0184835 A1 | 10/2003 | Goldberg et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2005/0219504 A1 | 10/2005 | Adachi et al. |
| 2006/0071846 A1 | 4/2006 | Yanagisawa et al. |
| 2006/0132752 A1 | 6/2006 | Kane |
| 2006/0209373 A1 | 9/2006 | Kato |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0002678 A1 | 1/2009 | Tanaka et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0091732 A1 | 4/2009 | Kato |
| 2009/0147239 A1 | 6/2009 | Zhu et al. |
| 2009/0153644 A1 | 6/2009 | Naito |

(56) References Cited

U.S. PATENT DOCUMENTS

| | | |
|---|---|---|
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Brochers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0063703 A1 | 3/2011 | Ishibe |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2012/0260512 A1 | 10/2012 | Kretschmer et al. |
| 2013/0076852 A1 | 3/2013 | Bai et al. |
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0229912 A1 | 8/2015 | Masalkar et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0006914 A1 | 1/2016 | Neumann |
| 2016/0047896 A1 | 2/2016 | Dussan |
| 2016/0047900 A1 | 2/2016 | Dussan |
| 2016/0047902 A1 | 2/2016 | Ishikawa et al. |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0113200 A1 | 4/2018 | Steinberg et al. |
| 2018/0136331 A1 | 5/2018 | Rosenzweig et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0239023 A1 | 8/2018 | Rubin |
| 2018/0275274 A1 | 9/2018 | Bao et al. |
| 2018/0284234 A1 | 10/2018 | Curatu |
| 2018/0284237 A1 | 10/2018 | Campbell et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0286320 A1 | 10/2018 | Tardif et al. |
| 2018/0292532 A1 | 10/2018 | Meyers et al. |
| 2018/0329060 A1 | 11/2018 | Pacala et al. |
| 2018/0359460 A1 | 12/2018 | Pacala et al. |
| 2019/0011567 A1 | 1/2019 | Pacala et al. |
| 2019/0025428 A1 | 1/2019 | Li et al. |
| 2019/0101645 A1 | 4/2019 | Demersseman et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0154889 A1* | 5/2019 | McWhirter ....... H01L 27/14643 |
| 2019/0212416 A1 | 7/2019 | Li et al. |
| 2019/0250254 A1 | 8/2019 | Campbell et al. |
| 2019/0250270 A1 | 8/2019 | Suzuki et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310351 A1 | 10/2019 | Hughes et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 108051868 A | 5/2018 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 4/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |

(56) References Cited

FOREIGN PATENT DOCUMENTS

| | | |
|---|---|---|
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 4142702 A1 | 6/1993 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | S628119 A | 1/1987 |
| JP | H0683998 A | 3/1994 |
| JP | H11194018 A | 7/1999 |
| JP | 2007144667 A | 6/2007 |
| JP | 2008298520 A | 12/2008 |
| JP | 2009121836 A | 6/2009 |
| JP | 2010035385 A | 2/2010 |
| JP | 2014115182 A | 6/2014 |
| JP | 2016040662 A | 3/2016 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 9816801 A1 | 4/1998 |
| WO | 2016056545 A1 | 4/2016 |
| WO | 2017/110417 A1 | 6/2017 |
| WO | 2018/125725 A1 | 7/2018 |
| WO | 2018/129410 A1 | 7/2018 |
| WO | 2018126248 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPuise Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Vuthea et al., "A Design of Risley Scanner for LiDAR Applications," 2018 International Conference on Optical MEMS and Nanophotonics (OMN), 2 pages.
Notice of Allowance issued in Korean Patent Application No. 10-2021-7041437 dated Apr. 28, 2022, 6 pages.

\* cited by examiner

700 ⟶

┌─────────────────────────────────────────────────────┐
│ Emitting, from a Transceiver Module, Light Energy that Occupies a │
│ Plurality of Non-overlapping Angles such that the Emitted Light │
│ Energy is Transmitted Directly to a Polygon Structure, wherein the │ ⟵ 710
│ Plurality of Non-overlapping Angles Define a Vertical Angle of a │
│ Field of View of the LiDAR System │
└─────────────────────────────────────────────────────┘
                            ↓
┌─────────────────────────────────────────────────────┐
│ Rotating the Polygon Structure in a First Direction, wherein │
│ the Rotating Polygon Structure Defines a Lateral Angle of the │ ⟵ 720
│ Field of View of the LiDAR System │
└─────────────────────────────────────────────────────┘
                            ↓
┌─────────────────────────────────────────────────────┐
│ Adjusting a Position of the Transceiver Module in a Manner │
│ that Results in an Increase of Resolution of a Scene │ ⟵ 730
│ Captured within the Field of View │
└─────────────────────────────────────────────────────┘

FIG. 7

LIDAR DETECTION SYSTEMS AND METHODS

CROSS-REFERENCE TO A RELATED APPLICATION

This application claims the benefit of U.S. Provisional Application No. 62/615,280, filed Jan. 9, 2018, the disclosure of which is incorporated herein in its entirety.

FIELD OF THE INVENTION

The present disclosure relates to light detection and ranging (LiDAR), and in particular to LiDAR systems and methods for use in a vehicle.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Many of these systems are relatively large and bulky and thus require a relatively large amount of space on the vehicle. In addition, many of these systems are relatively power intensive.

It may be desirable to integrate a relatively compact and energy efficient LiDAR system within a vehicle.

BRIEF SUMMARY

Embodiments discussed herein refer to a relatively compact and energy efficient LiDAR system that can be mounted to a windshield on the interior cabin portion of a vehicle. In order to accommodate the relatively compact size of the LiDAR system, multiple moveable components are used to ensure that a desired resolution is captured in the system's field of view.

In one embodiment, a light detection and ranging (LiDAR) system for use with a vehicle is provided. The system can include a housing configured to be mounted to a windshield of the vehicle. The housing can include a transceiver module operative to transmit and receive light energy, the transceiver module includes at least one lens that defines a vertical angle of a field of view of the LiDAR system, and a polygon structure that defines a lateral angle of the field of view of the LiDAR system. The polygon structure is operative to redirect light energy transmitted from the transceiver module away from the housing, and redirect light energy reflected from an object within the field of view of the LiDAR system to the transceiver module. The system can include a moveable platform coupled to the transceiver module, the moveable platform operative to move the transceiver module in a manner that results in an increase of resolution of a scene captured within the field of view.

In one embodiment, a light detection and ranging (LiDAR) system for use with a vehicle is provided. The system can include a housing configured to be mounted to a windshield of the vehicle. The housing can include a transceiver module operative to transmit and receive light energy, the transceiver module comprising at least one lens that defines a vertical angle of a field of view of the LiDAR system; a polygon structure that defines a lateral angle of the field of view of the LiDAR system; and a moveable mirror positioned to redirect light energy passing between the transceiver module and the polygon structure, the moveable mirror operative to adjust angles of light being emitted by the transceiver module in a manner that results in an increase of resolution of a scene captured within the field of view.

In one embodiment, a method for using a LiDAR system comprising a transceiver module and polygon structure is provided. The method can include emitting, from the transceiver module, light energy that occupies a plurality of non-overlapping angles such that the emitted light energy is transmitted directly to the polygon structure, wherein the plurality of non-overlapping angles define a vertical angle of a field of view of the LiDAR system; rotating the polygon structure in a first direction, wherein the rotating polygon structure defines a lateral angle of the field of view of the LiDAR system; and adjusting a position of the transceiver module in a manner that results in an increase of resolution of a scene captured within the field of view.

In one embodiment, a method for using a LiDAR system comprising a transceiver module, a polygon structure, and a mirror is provided. The method can include emitting, from the transceiver module, light energy that occupies a plurality of non-overlapping angles such that the emitted light energy is transmitted directly to the mirror, which directs the light energy to the polygon structure, wherein the plurality of non-overlapping angles define a vertical angle of a field of view of the LiDAR system, rotating the polygon structure in a first direction, wherein the rotating polygon structure defines a lateral angle of the field of view of the LiDAR system, and adjusting a position of the mirror in a manner that results in an increase of resolution of a scene captured within the field of view.

In one embodiment, a method for using a LiDAR system that includes a transceiver module, a polygon structure, and a mirror is provided. The method can include emitting, from the transceiver module, light energy that occupies a plurality of non-gap angles such that the emitted light energy is transmitted directly to the mirror, which directs the light energy to the polygon structure, wherein the plurality of non-gap angles and number of detectors define a vertical resolution of the LiDAR system, and wherein a maximum rotating angle of the mirror defines the angle of a field of view of the LiDAR system, and rotating the polygon structure in a first direction, wherein the rotating polygon structure defines a lateral angle of the field of view of the LiDAR system.

A further understanding of the nature and advantages of the embodiments discussed herein may be realized by reference to the remaining portions of the specification and the drawings.

BRIEF DESCRIPTION OF THE DRAWINGS

FIG. 7 shows an illustrative process, according to an embodiment;

DETAILED DESCRIPTION

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1A:
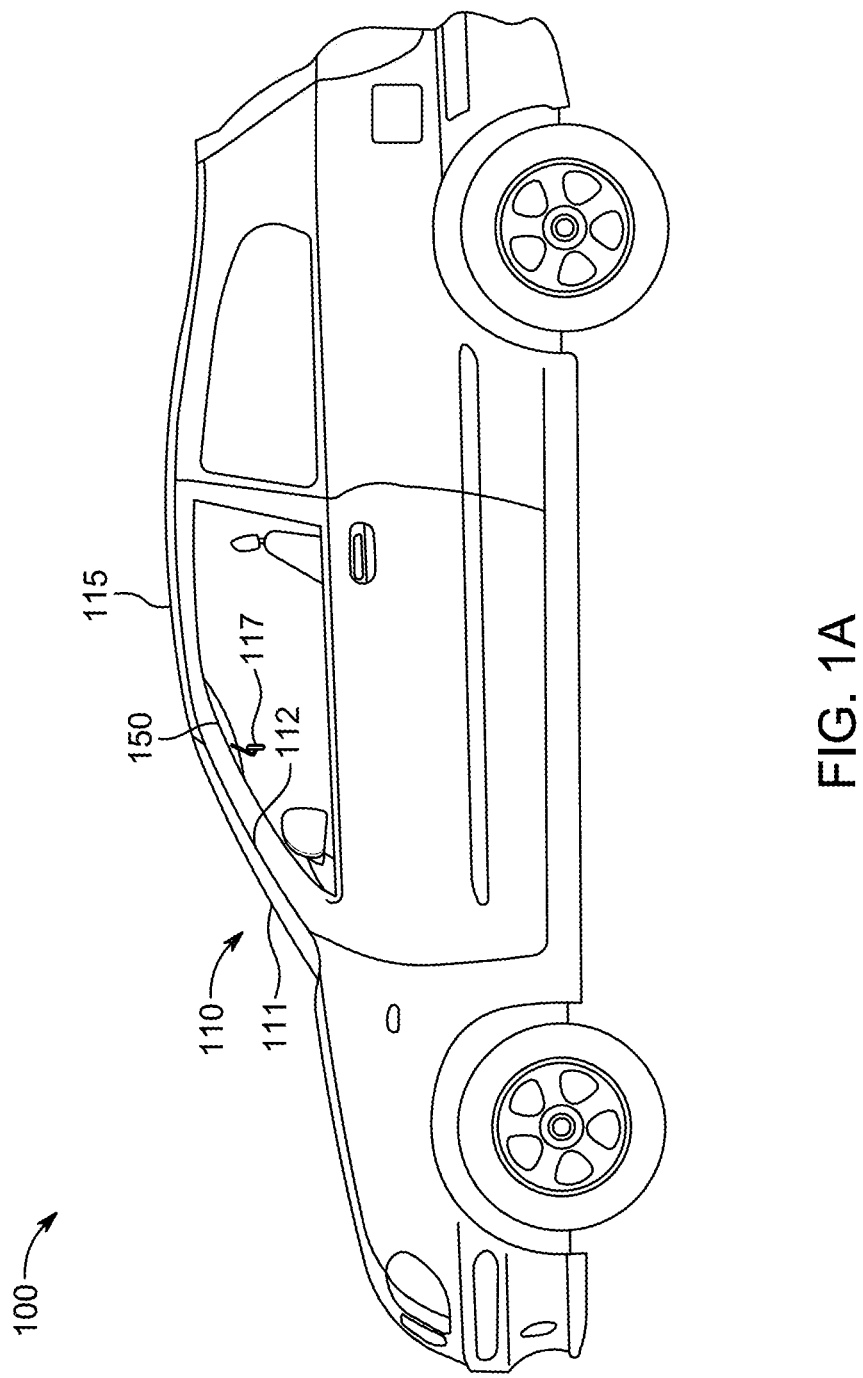
FIGS. 1A and 1B illustrate side and front views of a vehicle having a windshield mounted LiDAR system, according to an embodiment.
Figure 1B:
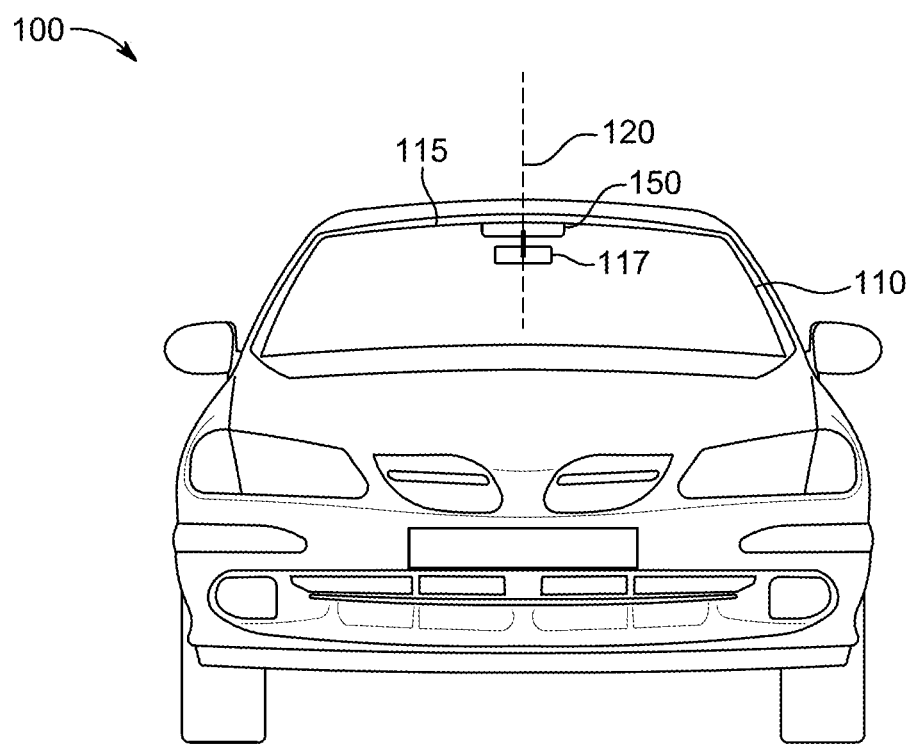

FIGS. 1A and 1B illustrate side and front views of vehicle 100 having a windshield mounted LiDAR system (WMLS) 150, according to an embodiment. Vehicle 100 is a generic representation of any vehicle that can transport persons or cargo from one location to another. Vehicle 100 has windshield 110, which has an exterior surface 111 that is exposed to the elements and an interior surface 112 that interfaces with the interior cabin of the vehicle. WMLS 150 can be mounted to the interior surface 112 of windshield 110. As illustrated in the FIGS., WMLS 150 is center mounted on windshield 110 along center axis 120 and near roof 115, such that it is positioned near the location of rear view mirror 117. It should be understood that the position of WMLS 150 is merely illustrative and that WMLS 150 can be positioned anywhere on windshield 110. If desired, more than one WMLS 150 can be mounted to windshield 110. In addition, one or more LiDAR systems according to embodiments discussed herein can be mounted anywhere on vehicle 100.

WMLS 150 can be a front facing, forward scanning system that captures lateral and vertical resolution of the 3D space existing in front of the vehicle. The lateral and vertical resolution can define the field of view of WMLS 150. In some embodiments, the lateral field of view is greater than the vertical field of view. For example, the lateral field of view can range from 100-180 degrees, or 110-170 degrees, or can be 120 degrees, whereas the vertical field of view can range from 20-50 degrees, 25-45 degrees, or 40 degrees. The ranging distance of the field of view can be set to any desired distance. For example, the ranging distance may be 50-300 meters, 100-200 meters, or 150 meters.

Figure 2:
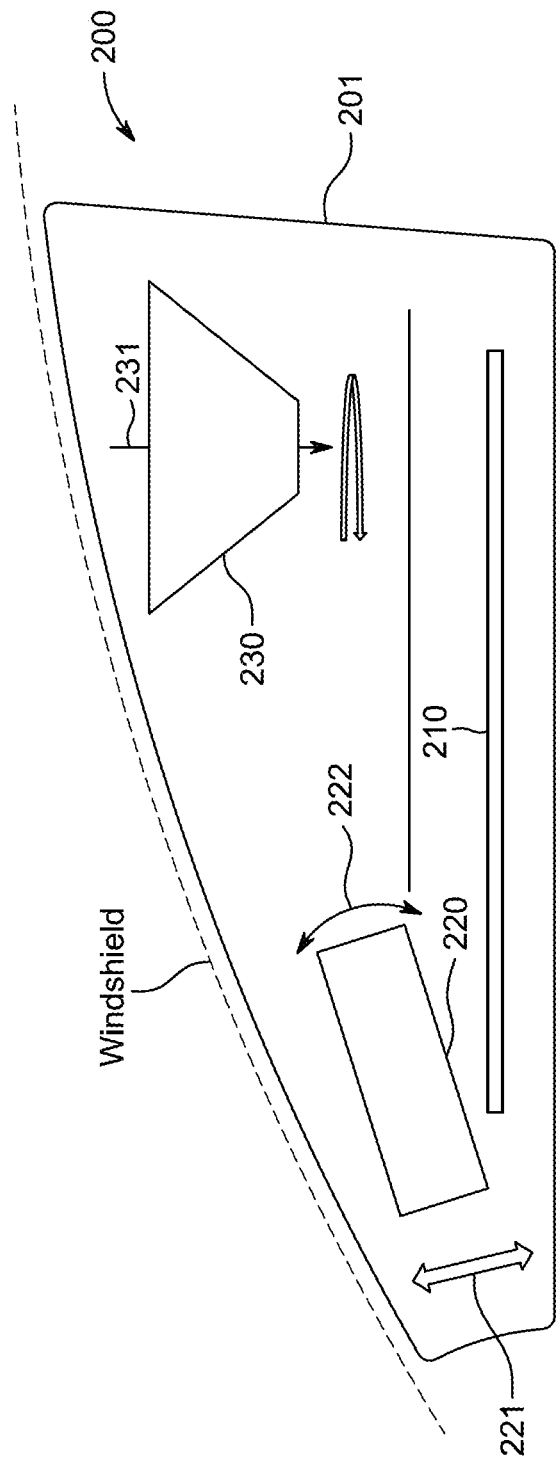
FIG. 2 shows illustrative window mounted LiDAR system, according to an embodiment.

FIG. 2 shows illustrative WMLS 200 according to an embodiment. WMLS 200 can include housing 201, circuit board 210, transceiver module 220, and polygon structure 230. Housing 201 is constructed to house circuit board 210, transceiver module 220, and polygon structure 230 and can be mounted to a windshield or to other structures located on a vehicle. Circuit board 210 may include circuitry such as control electronics, power electronics, communications circuitry, power and data busses, and any other components. In some embodiments, circuit board 210 may be a metal based circuit board to assist in heat dissipation (e.g., when silicon based laser emitters are used). Transceiver module 220 may include LiDAR emitter(s) and detectors and lenses required to control dispersal of light energy emitted by the emitter(s) and receipt of returning light being detected by the detectors. During operation, light energy is emitted by emitter(s) towards polygon structure 230, which redirects the light energy out of housing 201 and through the windshield. The light energy being directed by polygon structure 230 is cast in accordance with the field of view parameters of WMLS 200. That is, if WMLS 200 has a field of view with range of x, a lateral angle of y, and vertical angle of z, the range x can be controlled by the power of the emitter(s), the vertical angle z can be controlled by lenses (not shown) of transceiver module 220, and the lateral angle y can be controlled by polygon structure 230. Light energy that is reflected back from objects in the field of view passes through the windshield, returns to polygon structure 230 and is redirected back to transceiver module 220, which detects the light energy with its detectors.

The facets number of polygon structure 230 is determined to accommodate horizontal FOV. The facet of polygon can be parallel or non-parallel to its symmetric axis. Polygon structure 230 may be constructed from a metal such as aluminum, a plastic, or other material that can have a polished or mirrored surface. Polygon structure may be selectively masked to control the lateral dispersion of light energy being projected in accordance with the field of view of WMLS 200. Polygon structure 230 is operative to spin about axis 231 in a first direction at a substantially constant speed. The axis 231 can be coincident to structure 230's symmetrical axis or it can be tilted at an angle to with respect to structure 230's symmetrical axis, which can effectively increase resolution in vertical angle of z. A motor such as a DC motor may control the spin of structure 230. The final shape of polygon can be trimmed (i.e., chop off the sharp corner or tip to reduce overall weight, chamfer the sharp edge to reduce air resistance) for better operation performance.

Transceiver module 220 may be placed on a movable platform (not shown) that can change the position or pointing of transceiver module 220 within housing 201. The platform may move the entire module 220 in the directions of arrow 221. In this arrangement, module 220 may be raised and lowered. Alternatively, the platform may rotate module 220 (about a rotation axis) along the directions of arrow 222. Moving transceiver module 220 enables WMLS 200 to increase its resolution by capturing image data that exists in gaps caused by the lenses being used in transceiver module 220.

Figure 3:
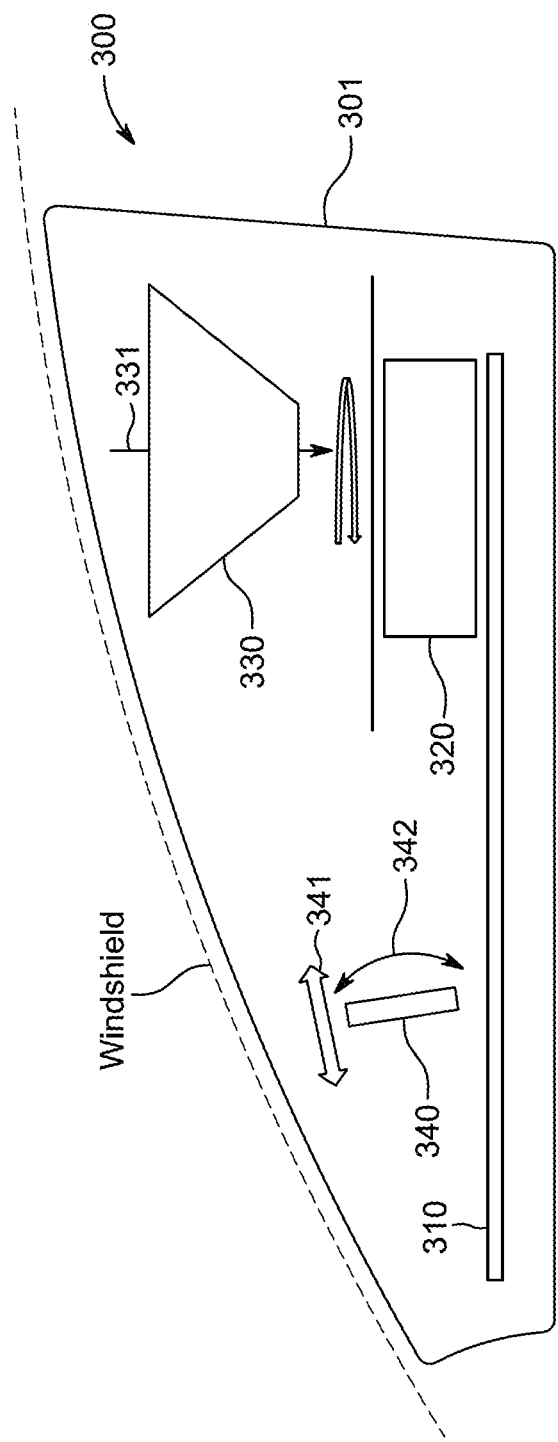
FIG. 3 shows another illustrative window mounted LiDAR system, according to an embodiment.

FIG. 3 shows illustrative WMLS 300 according to an embodiment. WMLS 300 can include housing 301, circuit board 310, transceiver module 320, polygon structure 330, and mirror 340. Housing 301 is constructed to house circuit board 310, transceiver module 320, polygon structure 330, and mirror 340 and can be mounted to a windshield or to other structures located on a vehicle. Circuit board 310, transceiver module 320, and polygon structure 330 may be similar to circuit board 210, transceiver module 220, and polygon structure 230 of FIG. 2 and thus a corresponding description need not be repeated. WMLS 300 differs from WMLS 200 with the addition of mirror 340 and repositioning of transceiver module 320. Transceiver module 320 may be placed in a permanently fixed position relative to circuit board 310 and operative to direct light energy towards mirror 340 and receive reflected light energy from mirror 340. Mirror 340 is operative to redirect light energy transmitted from transceiver module 320 to polygon structure 330. Mirror 340 is also operative to redirect light energy received from polygon structure 330 back to transceiver module 320 for detection by the detectors (not shown). Mirror 340 may be moved in directions shown by arrow 341 or 342 to increase the resolution of WMLS 300 by capturing image data that exists in gaps caused by the lenses being used in transceiver module 320.

Figure 4:
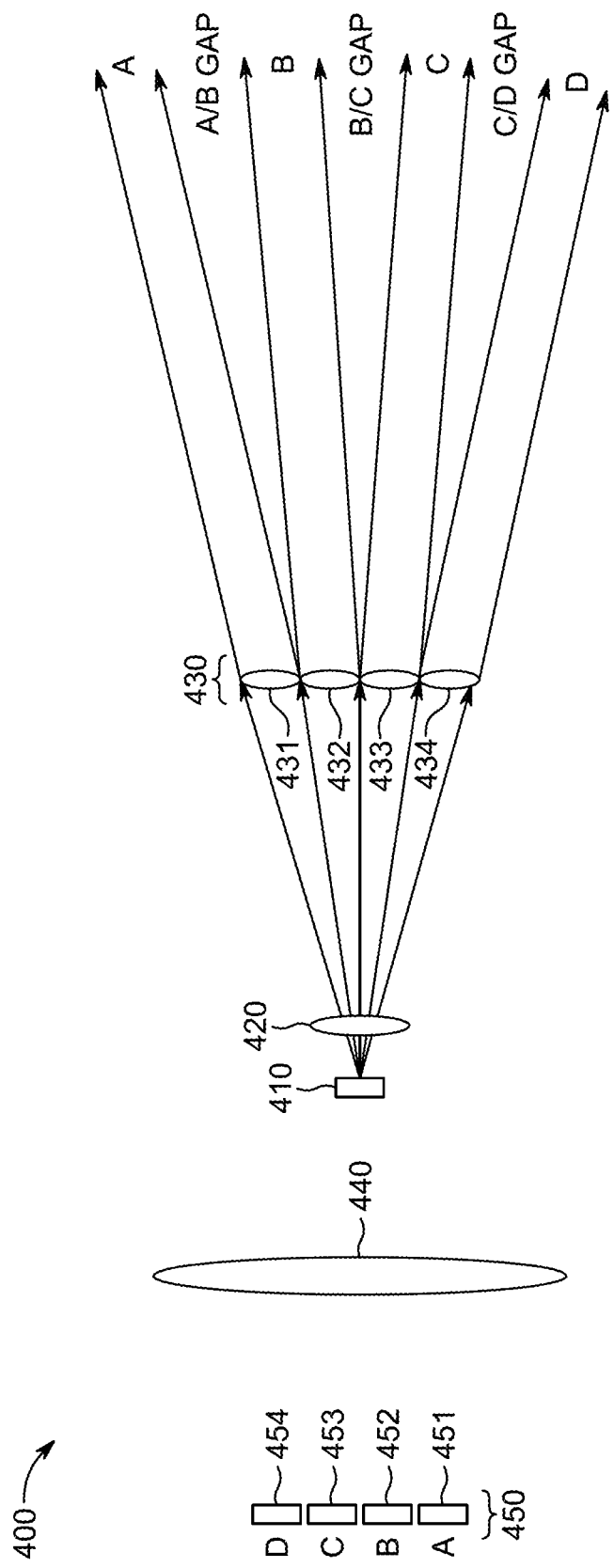
FIG. 4 shows illustrative block diagram arrangement of a fiber optical emitter transceiver module, according to an embodiment.

FIG. 4 shows illustrative block diagram arrangement of a fiber optic transceiver module 400 according to an embodiment. Module 400 may be used as one of transceiver modules 220 or 320 of FIGS. 2 and 3, respectively. Module 400 can include fiber optic light source 410, lens 420, lens group 430, receiver lens 440, and detector group 450. Light energy emanating from fiber optic light source 410 may be collimated by lens 420, which may be, for example, a cylindrical lens, before the light energy is dispersed by lens group 430. Lens group 430 can include any suitable number of lenses to control, for example, the vertical angle of the field of view. As shown, lens group 430 can include lenses 431-434. Each of lenses 431-434 may independently direct light energy according to non-overlapping angles shown as vectors A, B, C, and D. Each lens corresponds to a particular range of angles. That is, lens 431 corresponds to angles of vector A, lens 432 corresponds to angles of vector B, lens 433 corresponds to angles of vector C, and lens 434 corresponds to angles of vector D. That the light energy being emitted from light source 410 for each of vectors A-D do not overlap also ensures that the light energy being received by detector group 450 also do not overlap. That is, light energy originating from lens 431 is received only by detector 451, light energy originating from lens 432 is received only by detector 452, light energy originating from lens 433 is received only by detector 453, and light energy originating from lens 434 is received only by detector 454.

Gaps may exist between the angles represented by vectors A-D. That is, gaps exist between vectors A and B (shown as A/B Gap), B and C (shown as B/C Gap), and C and D (shown as C/D Gap). In this case, the angle between A and D defines the vertical field of view. The LiDAR systems according to embodiments discussed herein take these gaps into account by moving transceiver module 220 (as shown in FIG. 2) or moving mirror 340 (as shown in FIG. 3). By moving either the transceiver module or mirror, the LiDAR system is able to fill the gaps with additional resolution in its task to create a 3D image of the space captured within the system's field of view.

Figure 5:
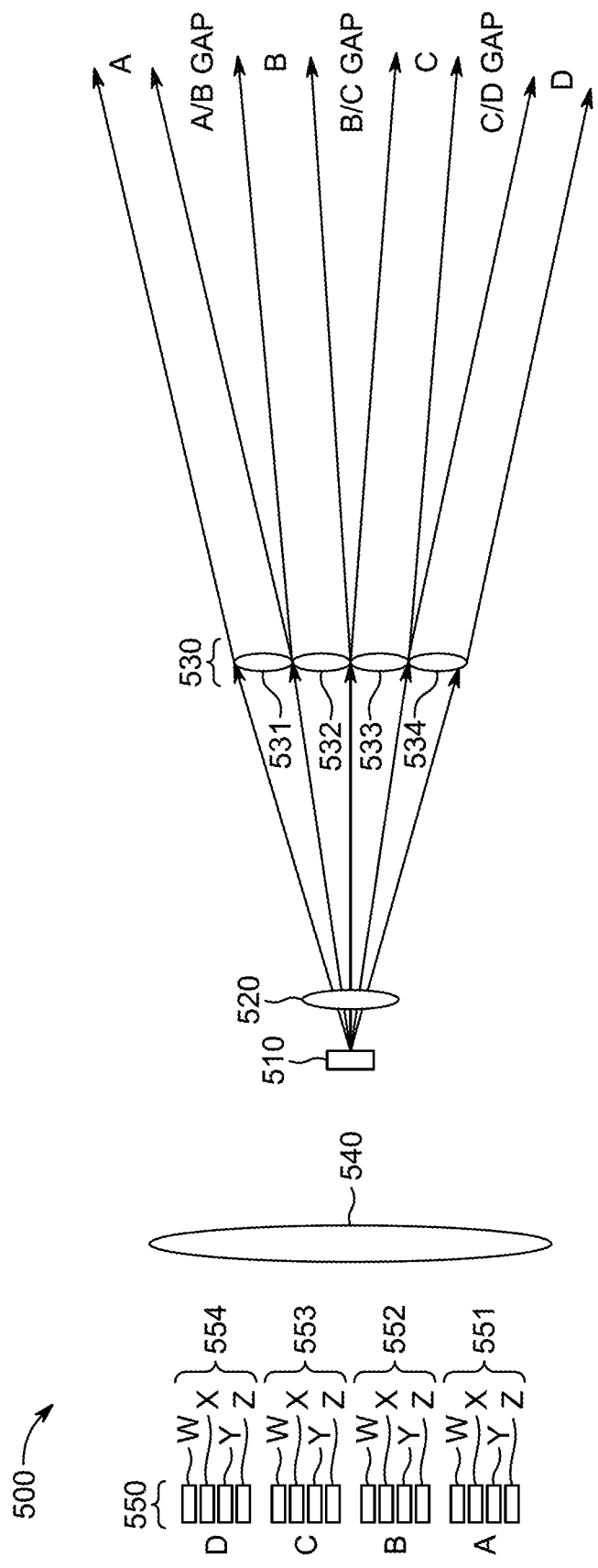
FIG. 5 shows illustrative block diagram arrangement of a semiconductor based emitter transceiver module, according to an embodiment.

FIG. 5 shows illustrative block diagram arrangement of a semiconductor based emitter transceiver module 500 according to an embodiment. Module 500 may be used as one of transceiver modules 220 or 320 of FIGS. 2 and 3, respectively. Module 500 can include semiconductor based emitter light source 510, lens 520, lens group 530, receiver lens 540, and detector group 550. Light source 510 can include several semiconductor based light emitters. For example, in one embodiment, multiple emitters can fire laser pulses sequentially and/or simultaneously.

Light energy emanating from light source 510 may be collimated by lens 520, which may be, for example, a cylindrical lens, before the light energy is dispersed by lens group 530. Lens group 530 can include any suitable number of lenses to control, for example, the vertical angle of the field of view. As shown, lens group 530 can include lenses 531-534. Each of lenses 531-534 may independently direct light energy according to non-overlapping angles shown as vectors A, B, C, and D. Each lens corresponds to a particular range of angles, as explained above in connection with FIG. 4. That is, lens 531 corresponds to angles of vector A, lens 532 corresponds to angles of vector B, lens 533 corresponds to angles of vector C, and lens 534 corresponds to angles of vector D. That the light energy being emitted from light source 510 for each of vectors A-D do not overlap also ensures that the light energy being received by detector group 550 also do not overlap. Detector group 550 may include several detector chips for each one of lenses 531-534 of lens group 530. Detector group 550 can include detector subgroups 551-554, where subgroups 551-554 are designed to detect signals emanating from lenses 531-534, respectively. Each of subgroups 551-554 may include individual detectors, labeled w-z. Inclusion of multiple detector chips per subgroup enables for reduced complexity of receiving optics 540 and further enables each subgroup to cover the returning angles from each one of lenses 531-534. If gaps exist between angles defined by vectors A-D (e.g., such as A/B Gap, B/C Gap, and C/D Gap), the LiDAR system can be oscillated to account for those gaps by moving transceiver module 220 (as shown in FIG. 2) or moving mirror 340 (as shown in FIG. 3).

Figure 6:
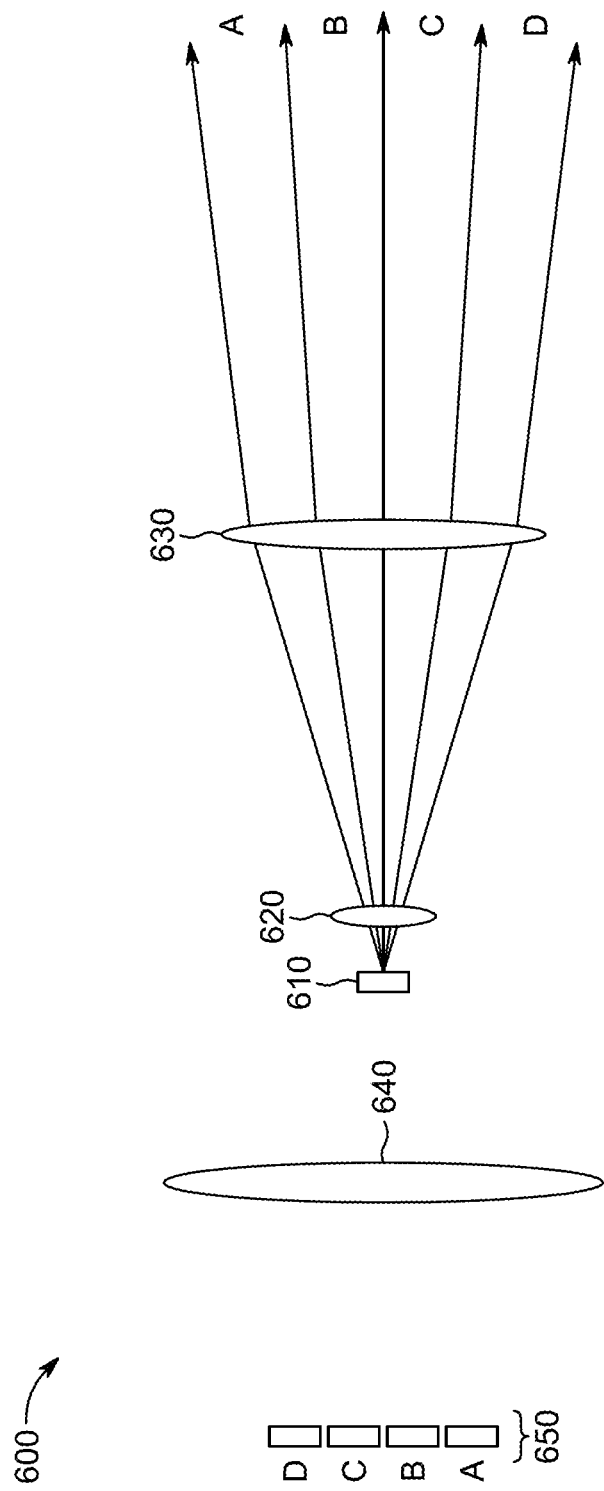
FIG. 6 shows illustrative block diagram arrangement of a transceiver module, according to an embodiment.

FIG. 6 shows illustrative block diagram arrangement of a transceiver module 600 according to an embodiment. Module 600 can include light source 610 (e.g., either fiber optic light source or silicon based emitter light sources), lens 620, lens 630, receiving lens 640, and detector group 650. Detector group 650 can resemble detector group 450 if the light source is fiber optic based, or detector group 650 can resemble detector group 550 if the light source includes multiple emitters. Transceiver module 600 differs from transceiver modules 400 and 500 in that there is substantially no gap between angles represented by vectors A-D. The angle between adjacent vectors, like A and B, or B and C, is very small and may be designed to represent the vertical angular resolution. Thus, module 600 would be used in a system such WMLS 200 or 300 to produce the desired field of view. In this case, rotating angle of WMLS 200 or 300 defines the vertical field of view.

FIG. 7 shows an illustrative process 700 according to an embodiment. Process 700 may be implemented in a system such as WMLS 200 of FIG. 2. Starting at step 710, light energy can be emitted from a transceiver module. The light energy can occupy a plurality of non-overlapping angles and is transmitted directly to a polygon structure. The plurality of non-overlapping angles define a vertical angle of a field of view of the LiDAR system. At step 720, the polygon structure can be rotated in a first direction, wherein the rotating polygon structure defines a lateral angle of the field of view of the LiDAR system. At step 730, a position of the transceiver module can be adjusted in a manner that results in an increase of resolution of a scene captured within the field of view.

It should be understood that the steps in FIG. 7 are merely illustrative and that additional steps may be added and the order to the steps may be rearranged.

Figure 8:
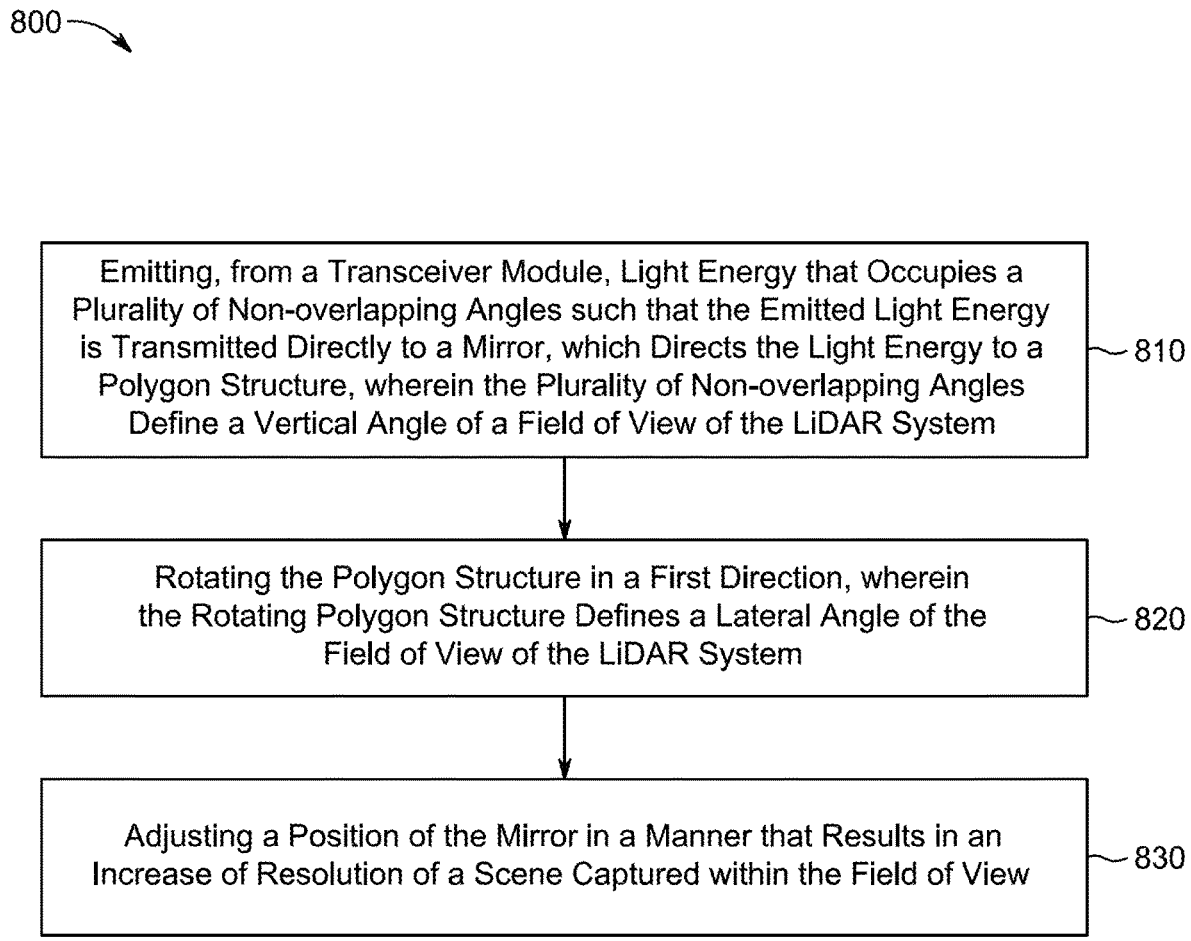
FIG. 8 shows another illustrative process, according to an embodiment.

FIG. 8 shows an illustrative process 800 according to an embodiment. Process 800 may be implemented in a system such as WMLS 300 of FIG. 3. Starting at step 810, light energy is emitted from a transceiver module. The light energy occupies a plurality of non-overlapping angles and is transmitted directly to a mirror, which directs the light energy to a polygon structure. The plurality of non-overlapping angles define a vertical angle of a field of view of the LiDAR system. At step 820, the polygon structure is rotated in a first direction, wherein the rotating polygon structure defines a lateral angle of the field of view of the LiDAR system. At step 830, a position of the mirror is adjusted in a manner that results in an increase of resolution of a scene captured within the field of view.

It should be understood that the steps in FIG. 8 are merely illustrative and that additional steps may be added and the order to the steps may be rearranged.

Figure 9:
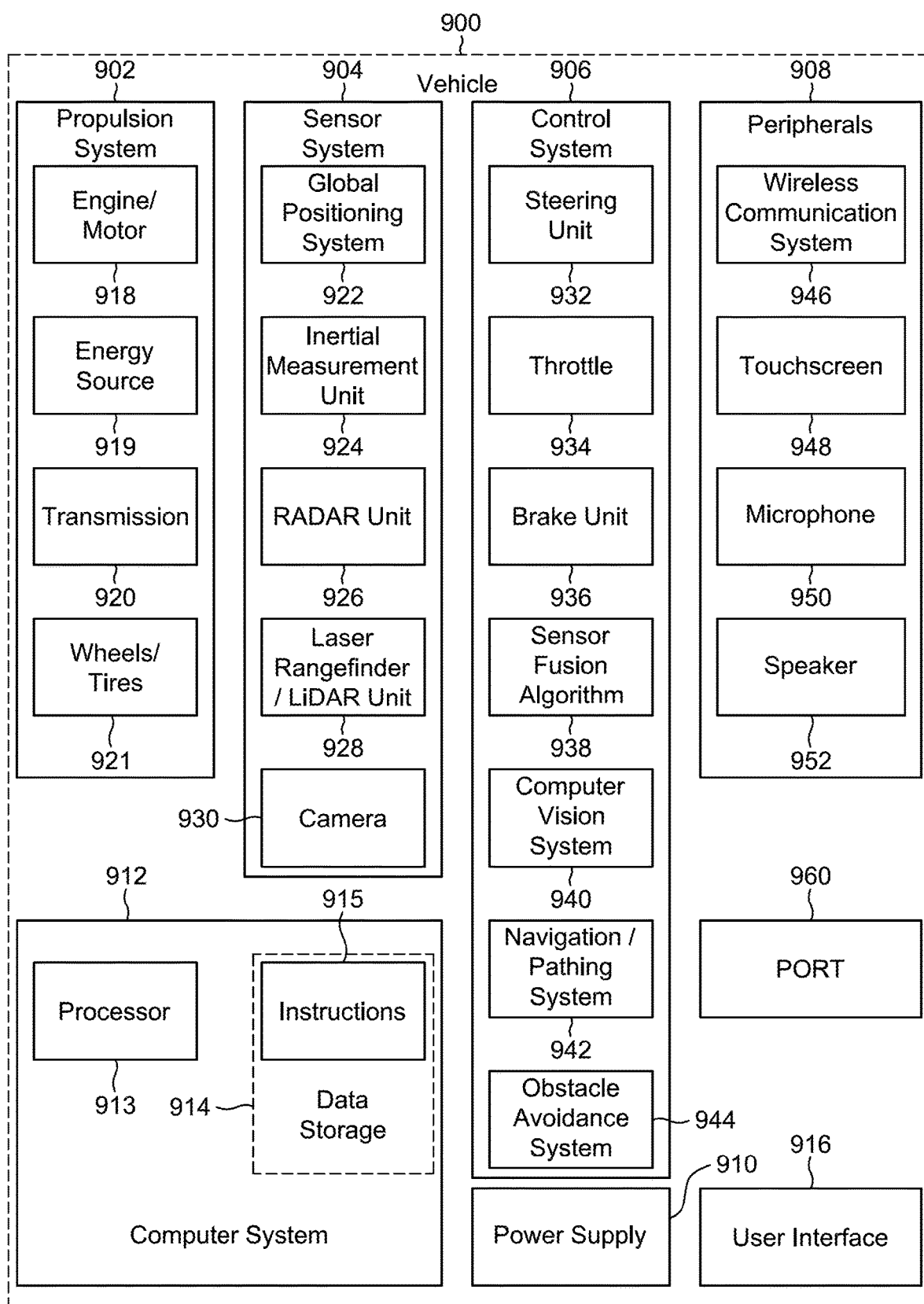
FIG. 9 is a functional block diagram illustrating a vehicle system, according to an embodiment.

FIG. 9 is a functional block diagram illustrating a vehicle system 900, according to an example embodiment. Vehicle 900 can be configured to operate fully or partially in an autonomous mode. For example, vehicle 900 can control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control vehicle 900 based on the determined information. While in autonomous mode, the vehicle 900 may be configured to operate without human interaction.

In some embodiments, vehicle 900 can operate under solely control of a human operator, but the various sensors and systems of the vehicle and the road conditions (e.g., road and the path traveled, other vehicles, stop signs, traffic lights, various events occurring outside of the vehicle) can be monitored and recorded.

Vehicle 900 can include various subsystems such as a propulsion system 902, a sensor system 904, a control system 906, one or more peripherals 908, as well as a power supply 910, a computer system 912, and a user interface 916. Vehicle 900 may include more or fewer subsystems and each subsystem can include multiple elements. Further, each of the subsystems and elements of vehicle 900 can be interconnected. Thus, one or more of the described functions of the vehicle 900 may be divided up into additional functional or physical components, or combined into fewer functional or physical components. In some further examples, additional functional and/or physical components may be added to the examples illustrated by FIG. 9.

Propulsion system 902 may include components operable to provide powered motion for the vehicle 900. Depending upon the embodiment, the propulsion system 902 can include an engine/motor 918, an energy source 919, a transmission 920, and wheels/tires 921. The engine/motor 918 can be any combination of an internal combustion engine, an electric motor, steam engine, Stirling engine, or other types of engines and/or motors. In some embodiments, the engine/motor 918 may be configured to convert energy source 919 into mechanical energy. In some embodiments, the propulsion system 902 can include multiple types of engines and/or motors. For instance, a gas-electric hybrid car can include a gasoline engine and an electric motor. Other examples are possible.

Energy source 919 can represent a source of energy that may, in full or in part, power the engine/motor 918. That is, the engine/motor 918 can be configured to convert the energy source 919 into mechanical energy. Examples of energy sources 919 include gasoline, diesel, other petroleum-based fuels, propane, other compressed gas-based fuels, ethanol, solar panels, batteries, and other sources of electrical power. The energy source(s) 919 can additionally or alternatively include any combination of fuel tanks, batteries, capacitors, and/or flywheels. The energy source 919 can also provide energy for other systems of the vehicle 900.

Transmission 920 can include elements that are operable to transmit mechanical power from the engine/motor 918 to the wheels/tires 921. To this end, the transmission 920 can include a gearbox, clutch, differential, and drive shafts. The transmission 920 can include other elements. The drive shafts can include one or more axles that can be coupled to the one or more wheels/tires 921.

Wheels/tires 921 of vehicle 900 can be configured in various formats, including a unicycle, bicycle/motorcycle, tricycle, or car/truck four-wheel format. Other wheel/tire geometries are possible, such as those including six or more wheels. Any combination of the wheels/tires 921 of vehicle 900 may be operable to rotate differentially with respect to other wheels/tires 921. The wheels/tires 921 can represent at least one wheel that is fixedly attached to the transmission 920 and at least one tire coupled to a rim of the wheel that can make contact with the driving surface. The wheels/tires 921 can include any combination of metal and rubber, or another combination of materials.

Sensor system 904 may include a number of sensors configured to sense information about an environment of the vehicle 900. For example, the sensor system 904 can include a Global Positioning System (GPS) 922, an inertial measurement unit (IMU) 924, a RADAR unit 926, a laser rangefinder/LIDAR unit 928, and a camera 930. The sensor system 904 can also include sensors configured to monitor internal systems of the vehicle 900 (e.g., 02 monitor, fuel gauge, engine oil temperature). Other sensors are possible as well.

One or more of the sensors included in sensor system 904 can be configured to be actuated separately and/or collectively in order to modify a position and/or an orientation of the one or more sensors.

GPS 922 may be any sensor configured to estimate a geographic location of the vehicle 900. To this end, GPS 922 can include a transceiver operable to provide information regarding the position of the vehicle 900 with respect to the Earth.

IMU 924 can include any combination of sensors (e.g., accelerometers and gyroscopes) configured to sense position and orientation changes of the vehicle 900 based on inertial acceleration.

RADAR unit 926 may represent a system that utilizes radio signals to sense objects within the local environment of the vehicle 900. In some embodiments, in addition to sensing the objects, the RADAR unit 926 may additionally be configured to sense the speed and/or heading of the objects. Similarly, laser rangefinder or LIDAR unit 928 may be any sensor configured to sense objects in the environment in which the vehicle 900 is located using lasers. Depending upon the embodiment, the laser rangefinder/LIDAR unit 928 can include one or more laser sources, a laser scanner, and one or more detectors, among other system components. The laser rangefinder/LIDAR unit 928 can be configured to operate in a coherent (e.g., using heterodyne detection) or an incoherent detection mode.

Camera 930 can include one or more devices configured to capture a plurality of images of the environment of vehicle 900. Camera 930 can be a still camera or a video camera.

Control system 906 may be configured to control operation of vehicle 900 and its components. Accordingly, control system 906 can include various elements include steering unit 932, throttle 934, brake unit 936, a sensor fusion algorithm 938, a computer vision system 940, a navigation/pathing system 942, and an obstacle avoidance system 944.

Steering unit 932 can represent any combination of mechanisms that may be operable to adjust the heading of vehicle 900. Throttle 934 can be configured to control, for instance, the operating speed of the engine/motor 918 and, in turn, control the speed of the vehicle 900. Brake unit 936 can include any combination of mechanisms configured to decelerate the vehicle 900. Brake unit 936 can use friction to slow wheels/tires 921. In other embodiments, the brake unit 936 can convert the kinetic energy of wheels/tires 921 to electric current. The brake unit 936 may take other forms as well. The brake unit 936 may control braking of the vehicle 900, for example, using a braking algorithm that takes into account input from one or more units of the sensor system 904.

Sensor fusion algorithm 938 may be an algorithm (or a computer program product storing an algorithm) configured to accept data from the sensor system 904 as an input. The data may include, for example, data representing information sensed at the sensors of the sensor system 904. The sensor fusion algorithm 938 can include, for instance, a Kalman filter, Bayesian network, or other algorithm. The sensor fusion algorithm 938 can further provide various assessments based on the data from sensor system 904. Depending upon the embodiment, the assessments can include evaluations of individual objects and/or features in the environment of vehicle 900, evaluation of a particular situation, and/or evaluate possible impacts based on the particular situation. Other assessments are possible.

Computer vision system 940 may be any system operable to process and analyze images captured by camera 930 in order to identify objects and/or features in the environment of vehicle 900 that can include traffic signals, road way boundaries, and obstacles. Computer vision system 940 can use an object recognition algorithm, a Structure From Motion (SFM) algorithm, video tracking, and other computer vision techniques. In some embodiments, the computer vision system 940 can be additionally configured to map an environment, track objects, estimate the speed of objects, etc.

Navigation and pathing system 942 may be any system configured to determine a driving path for the vehicle 900, for example, by referencing navigation data such as geographical or map data. The navigation and pathing system 942 may additionally be configured to update the driving path dynamically while the vehicle 900 is in operation. In some embodiments, the navigation and pathing system 942 can be configured to incorporate data from the sensor fusion algorithm 938, the GPS 922, and one or more predetermined maps so as to determine the driving path for vehicle 900. Obstacle avoidance system 944 can represent a control system configured to identify, evaluate, and avoid or otherwise negotiate potential obstacles in the environment of the vehicle 900. Control system 906 may additionally or alternatively include components other than those shown and described.

Peripherals 908 may be configured to allow interaction between the vehicle 900 and external sensors, other vehicles, other computer systems, and/or a user. For example, peripherals 908 can include a wireless communication system 946, a touchscreen 948, a microphone 950, and/or a speaker 952. In an example embodiment, peripherals 908 can provide, for instance, means for a user of the vehicle 900 to interact with the user interface 916. To this end, touchscreen 948 can provide information to a user of vehicle 900. User interface 916 can also be operable to accept input from the user via the touchscreen 948. The touchscreen 948 may be configured to sense at least one of a position and a movement of a user's finger via capacitive sensing, resistance sensing, or a surface acoustic wave process, among other possibilities. Touchscreen 948 may be capable of sensing finger movement in a direction parallel or planar to the touchscreen surface, in a direction normal to the touchscreen surface, or both, and may also be capable of sensing a level of pressure applied to the touchscreen surface. Touchscreen 948 may be formed of one or more translucent or transparent insulating layers and one or more translucent or transparent conducting layers. Touchscreen 948 may take other forms as well.

In other instances, peripherals 908 may provide means for the vehicle 900 to communicate with devices within its environment. Microphone 950 may be configured to receive audio (e.g., a voice command or other audio input) from a user of vehicle 900. Similarly, speakers 952 may be configured to output audio to the user of vehicle 900.

In one example, wireless communication system 946 can be configured to wirelessly communicate with one or more devices directly or via a communication network. For example, wireless communication system 946 can use 3G cellular communication, such as CDMA, EVDO, GSM/GPRS, or 4G cellular communication, such as WiMAX or LTE. Alternatively, wireless communication system 946 can communicate with a wireless local area network (WLAN), for example, using WiFi. In some embodiments, wireless communication system 946 can communicate directly with a device, for example, using an infrared link, Bluetooth, or ZigBee. Other wireless protocols, such as various vehicular communication systems, are possible within the context of the disclosure. For example, the wireless communication system 946 can include one or more dedicated short range communications (DSRC) devices that can include public and/or private data communications between vehicles and/or roadside stations.

Power supply 910 may provide power to various components of vehicle 900 and can represent, for example, a rechargeable lithium-ion or lead-acid battery. In some embodiments, one or more banks of such batteries can be configured to provide electrical power. Other power supply materials and configurations are possible. In some embodiments, the power supply 910 and energy source 919 can be implemented together, as in some all-electric cars.

Many or all of the functions of vehicle 900 can be controlled by computer system 912. Computer system 912 may include at least one processor 913 (which can include at least one microprocessor) that executes instructions 915 stored in a non-transitory computer readable medium, such as the data storage 914. Computer system 912 may also represent a plurality of computing devices that may serve to control individual components or subsystems of the vehicle 900 in a distributed fashion.

In some embodiments, data storage 914 may contain instructions 915 (e.g., program logic) executable by processor 913 to execute various functions of vehicle 900, including those described above in connection with FIG. 9. In some embodiments, processor 913 may be operative to run an artificial intelligence (AI) engine, for example, to control the various systems of the vehicle 900. Data storage 914 may contain additional instructions as well, including instructions to transmit data to, receive data from, interact with, and/or control one or more of propulsion system 902, sensor system 904, control system 906, and peripherals 908. In addition to instructions 915, data storage 914 may store data such as roadway maps, path information, among other information. Such information may be used by vehicle 900 and computer system 912 at during the operation of vehicle 900 in the autonomous, semi-autonomous, and/or manual modes.

Vehicle 900 may include a user interface 916 for providing information to or receiving input from a user of vehicle 900. User interface 916 can control or enable control of content and/or the layout of interactive images that can be displayed on the touchscreen 948. Further, user interface 916 can include one or more input/output devices within the set of peripherals 908, such as wireless communication system 946, touchscreen 948, microphone 950, and the speaker 952.

Port 960 may be a port through which vehicle 900 receives power to charge power supply 910 and to communicate data stored in data store 914.

Computer system 912 may control the function of vehicle 900 based on inputs received from various subsystems (e.g., propulsion system 902, sensor system 104, and control system 906), as well as from user interface 916. For example, computer system 912 may utilize input from control system 906 in order to control steering unit 932 to avoid an obstacle detected by sensor system 904 and obstacle avoidance system 944. Depending upon the embodiment, computer system 912 can be operable to provide control over many aspects of vehicle 900 and its subsystems.

The components of vehicle 900 can be configured to work in an interconnected fashion with other components within or outside their respective systems. For instance, in an example embodiment, camera 930 can capture a plurality of images that can represent information about a state of an environment of vehicle 900 operating in an autonomous or manual mode. The environment can include every conceivable type of data that can be observed and collected by vehicle 900. For example, the environment can include the road and all aspects associated with the road such as temperature, composition of the road (e.g., concrete or asphalt), moisture level, lanes, curbs, turn lanes, cross walks, stop lights, stop signs, yield signs and other traffic signs, and barricades. The environment can include objects such as other vehicles, people, random debris in or adjacent to the road.

Computer system 912 can monitor and log the environmental inputs in conjunction with operational states of the vehicle. The operational states can refer to operational and control parameters of the vehicle such as speed, trajectory, steering input, acceleration input, and brake input, and also can include results of driver input or AI driver input. This way, regardless of whether the vehicle is operating in autonomous mode or under human control, computer system 912 can simultaneously log the environmental inputs and the operational states to provide a comprehensive vehicle log.

The vehicle log data acquired from the vehicle using embodiments discussed herein can be used in a number of different ways. For example, the vehicle log data and results from either manual driving data or autonomous driving data that is contains can be used to train vehicle AI offline based on actual recorded data and actual decisions made and the results of those decisions. The vehicle log data from one vehicle may include data pertaining to hundreds, thousands, or hundreds of thousands of driving miles. Thus, the data acquired from just one vehicle is a relatively rich environment for training vehicle AI. The training data may be further enriched by aggregating vehicle log data from numerous vehicles and users, thus providing additional resources for training and improving vehicle AI. The aggregated vehicle log data can represent hundreds of thousands, millions, or an ever increasing number of trips, across various road conditions and driving situations, and the actions taken in response thereto that can be used to train the AI.

In addition, the AI training can occur offline and not during real driving conditions. This way, the vehicle AI can run simulations based on the aggregated vehicle logs to without having to actually drive the vehicle. In some embodiments, the vehicle AI may be fed road conditions and driving situations as inputs, and the results performed by the vehicle AI may be compared to the actual results stored in the log. The vehicle AI can be trained based on a comparison of the results.

The vehicle log data, which includes sensor specific data gathered during a trip as well as all of the decisions and outcomes of those decisions, can be part of the information that the vehicle AI uses to train. In some embodiments, the results of the AI training can include what sensors are needed in the vehicle (and where they are located) and what sensors are not. For example, AI training can be performed with log data having a sensor (e.g., camera) in a first location on the vehicle and a second location on the vehicle. The results of AI driving performance based on both sensor locations can be compared and decisions can be made as to which sensor configuration yields the better result. This sensor based training can be used to evaluate an infinite number of sensor configurations, and the vehicle AI can be tuned to work with one or more of those sensor configurations.

The aggregate vehicle log data may be used to provide additional information regarding the wear and tear on vehicles overall. For example, if the brakes are worn down to 30% of normal, the vehicle log data can reflect how the vehicle reacts when these brakes are applied. The vehicle AI can be trained to take wear and tear into account and can adjust vehicle operation to compensate for that wear and tear. For example, the vehicle AI may cause the brakes to be applied earlier if the brake wear is below a certain threshold.

The vehicle log data, which may contain serval gigabytes or terabytes of data, can be transferred to a remote server (not shown) for further analysis. For example, the log may be transferred from data storage 914 to data storage associated with remote server.

The remote server may include an autonomous vehicle driving platform that can apply analytics (e.g., similar to some of the examples discussed above) to the log. The autonomous vehicle driving platform (AVDP) may include one or more algorithms capable of autonomously controlling operation of a vehicle. In one embodiment, the AVDP may assess the log to determine whether any updates or modifications are needed for the one or more algorithms to improve autonomous vehicle operation. In another embodiment, the AVDP may use the log to build one or more algorithms that can autonomously control operation of a vehicle. In yet another embodiment, the AVDP run simulations using the environmental inputs received in the log and compare the simulation results to the actual monitored actions of the vehicle (which are also included in the log).

Although FIG. 9 shows various components of vehicle 900, i.e., wireless communication system 946, computer system 912, data storage 914, and user interface 916, as being integrated into vehicle 900, one or more of these components can be mounted or associated separately from the vehicle 900. For example, data storage 914 can, in part or in full, exist separate from vehicle 900. Thus, vehicle 900 can be provided in the form of device elements that may be located separately or together. The device elements that make up vehicle 900 can be communicatively coupled together in a wired and/or wireless fashion.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-9, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system for use with a vehicle, comprising:
    a housing configured to be mounted to a windshield of the vehicle, the housing comprising:
        a transceiver module configured to transmit and receive light energy, the transceiver module comprising at least one lens that defines a vertical angle of a field of view of the LiDAR system;
        a polygon structure that defines a lateral angle of the field of view of the LiDAR system, the polygon structure configured to:
            redirect light energy transmitted from the transceiver module away from the housing; and
            redirect light energy reflected from an object within the field of view of the LiDAR system to the transceiver module;
        a moveable platform coupled to the transceiver module, the moveable platform configured to move the transceiver module in a manner that results in an increase of resolution of a scene captured within the field of view.

2. The LiDAR system of claim 1, wherein the transceiver module comprises:
    a light source;
    wherein the at least one lens that defines the vertical angle of the field of view of the LiDAR system is included as part of a lens group that defines the vertical angle of the field of view; and
    a detector group.

3. The LiDAR system of claim 2, wherein the light source is a fiber optic light source.

4. The LiDAR system of claim 2, wherein the light source is a semiconductor based emitter light source, the LiDAR system further comprising a metal based printed circuit board (PCB) and driver circuitry mounted to the metal based PCB.

5. The LiDAR system of claim 2, wherein the light source comprises a plurality of semiconductor based emitter light sources that fire light pulses in a sequence.

6. The LiDAR system of claim 2, wherein the lens group is configured to direct light energy along a plurality of non-overlapping angles, wherein a combination of the plurality of non-overlapping angles forms the vertical angle of the field of view.

7. The LiDAR system of claim 6, wherein a gap exists in between each of the plurality of non-overlapping angles, and wherein the moveable platform is configured to move the transceiver module in a manner that accounts for the gap that exists in between each of the plurality of non-overlapping angles.

8. The LiDAR system of claim 6, wherein the detector group comprises at least one detection circuit for each of the plurality of non-overlapping angles.

9. The LiDAR system of claim 1, wherein the polygon structure is configured to rotate about a rotation axis in a first direction at a substantially constant speed.

10. The LiDAR system of claim 9, wherein the rotation axis is coincident to or different to a symmetric axis of the polygon structure.

11. The LiDAR system of claim 9, wherein the polygon structure comprises a facet that is parallel to the rotation axis.

12. The LiDAR system of claim 9, wherein the polygon structure is masked.

13. The LiDAR system of claim 9, wherein the polygon structure is trimmed with respect to at least one corner or edge.

14. The LiDAR system of claim 9, wherein the polygon structure comprises a facet that is non-parallel to the rotation axis.

15. A light detection and ranging (LiDAR) system for use with a vehicle, comprising:
   a housing configured to be mounted to a windshield of the vehicle, the housing comprising:
      a transceiver module configured to transmit and receive light energy, the transceiver module comprising at least one lens that defines a vertical angle of a field of view of the LiDAR system;
      a polygon structure that defines a lateral angle of the field of view of the LiDAR system; and
      a moveable mirror positioned to receive the light energy from the transceiver module and redirect the received light energy to the polygon structure, the moveable mirror configured to adjust angles of light being emitted by the transceiver module in a manner that results in an increase of resolution of a scene captured within the field of view.

16. The LiDAR system of claim 15, wherein the transceiver module comprises:
   a light source;
   wherein the at least one lens that defines the vertical angle of the field of view of the LiDAR system is included as part of a lens group that defines the vertical angle of the field of view; and
   a detector group.

17. The LiDAR system of claim 16, wherein the light source is a fiber optic light source.

18. The LiDAR system of claim 16 wherein the light source is a semiconductor based emitter light source, the LiDAR system further comprising a metal based printed circuit board (PCB) and driver circuitry mounted to the metal based PCB.

19. The LiDAR system of claim 16, wherein the light source comprises a plurality of semiconductor based emitter light sources that fire light pulses in a sequence.

20. The LiDAR system of claim 16, wherein the lens group is configured to direct light energy along a plurality of non-overlapping angles, wherein a combination of the plurality of non-overlapping angles forms the vertical angle of the field of view.

21. The LiDAR system of claim 20, wherein a gap exists in between each of the plurality of non-overlapping angles, and wherein the moveable mirror is positioned to redirect light energy passing between the transceiver module and the polygon structure in a manner that accounts for the gap that exists in between each of the plurality of non-overlapping angles.

22. The LiDAR system of claim 20 wherein the detector group comprises at least one detection circuit for each of the plurality of non-overlapping angles.

23. The LiDAR system of claim 15, wherein the polygon structure is configured to rotate about a rotation axis in a first direction at a substantially constant speed.

24. The LiDAR system of claim 23, wherein the rotation axis is coincident to or different to a symmetric axis of the polygon structure.

25. The LiDAR system of claim 23, wherein the polygon structure comprises a facet that is parallel to the rotation axis.

26. The LiDAR system of claim 23 wherein the polygon structure is masked.

27. The LiDAR system of claim 23, wherein the polygon structure is trimmed with respect to at least one corner or edge.

28. The LiDAR system of claim 23, wherein the polygon structure comprises a facet that is non-parallel to the rotation axis.

29. A method for using a LiDAR system comprising a transceiver module and a polygon structure, the method comprising:
   emitting, from the transceiver module, light energy that occupies a plurality of non-overlapping angles such that the emitted light energy is transmitted directly to the polygon structure, wherein the plurality of non-overlapping angles define a vertical angle of a field of view of the LiDAR system;
   rotating the polygon structure in a first direction, wherein the rotating polygon structure defines a lateral angle of the field of view of the LiDAR system; and
   adjusting a position of the transceiver module in a manner that results in an increase of resolution of a scene captured within the field of view.

30. A method for using a LiDAR system comprising a transceiver module, a polygon structure, and a mirror, the method comprising:
   emitting, from the transceiver module, light energy that occupies a plurality of non-overlapping angles such that the emitted light energy is transmitted directly to the mirror, which directs the light energy to the polygon structure, wherein the plurality of non-overlapping angles define a vertical angle of a field of view of the LiDAR system;
   rotating the polygon structure in a first direction, wherein the rotating polygon structure defines a lateral angle of the field of view of the LiDAR system; and
   adjusting a position of the mirror in a manner that results in an increase of resolution of a scene captured within the field of view.

31. A method for using a LiDAR system comprising a transceiver module, a polygon structure, and a mirror, the method comprising:
   emitting, from the transceiver module, light energy that occupies a plurality of non-gap angles such that the emitted light energy is transmitted directly to the mirror, which directs the light energy to the polygon structure, wherein the plurality of non-gap angles and number of detectors define a vertical resolution of the LiDAR system, and wherein a maximum rotating angle of the mirror defines the angle of a field of view of the LiDAR system; and
   rotating the polygon structure in a first direction, wherein the rotating polygon structure defines a lateral angle of the field of view of the LiDAR system.

* * * * *